Sept. 6, 1960 W. K. MARTINEAU Re. 24,867

TRAILER FOR TRANSPORTING IRRIGATION CONDUIT

Original Filed July 17, 1956 2 Sheets-Sheet 1

INVENTOR.
WILLIAM K. MARTINEAU
BY Mallinckrodt and Mallinckrodt
ATTORNEYS

TRAILER FOR TRANSPORTING IRRIGATION CONDUIT

Original Filed July 17, 1956 2 Sheets-Sheet 2

INVENTOR.
WILLIAM K. MARTINEAU
BY Mullinckodt and Mullinckodt
ATTORNEYS

United States Patent Office

Re. 24,867
Reissued Sept. 6, 1960

24,867

TRAILER FOR TRANSPORTING IRRIGATION CONDUIT

William K. Martineau, 45 E. 2nd N., St. Anthony, Idaho

Original No. 2,832,608, dated Apr. 29, 1958, Ser. No. 598,316, July 17, 1956. Application for reissue Apr. 22, 1959, Ser. No. 808,287

4 Claims. (Cl. 280—63)

Matter enclosed in heavy brackets [ ] appears in the original patent but forms no part of this reissue specification; matter printed in italics indicates the additions made by reissue.

This invention relates to a trailer for transporting lengths of irrigation pipe.

Irrigation lines usually comprise independent pipe sections of approximately 40-feet in length secured together to form laterals approximately one-quarter of a mile long, and after an area has been irrigated, the lateral is shifted to another area to be irrigated. A lateral comprises approximately 33 sections of conventional irrigation pipe, each of said sections having a lateral riser to which a revolving sprinkler head is secured, and movement of such sections is not only time consuming, but very awkward due to the great lengths of the sections.

The primary object of the invention is to provide a practical and efficient trailer for transporting a lateral composed of thirty-three sections of irrigation pipe, including their risers, with a minimum expenditure of time and effort in loading and unloading.

Another object of the invention is to provide a trailer of the character indicated which can be readily and economically manufactured, is easily used, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figures 1, 2:
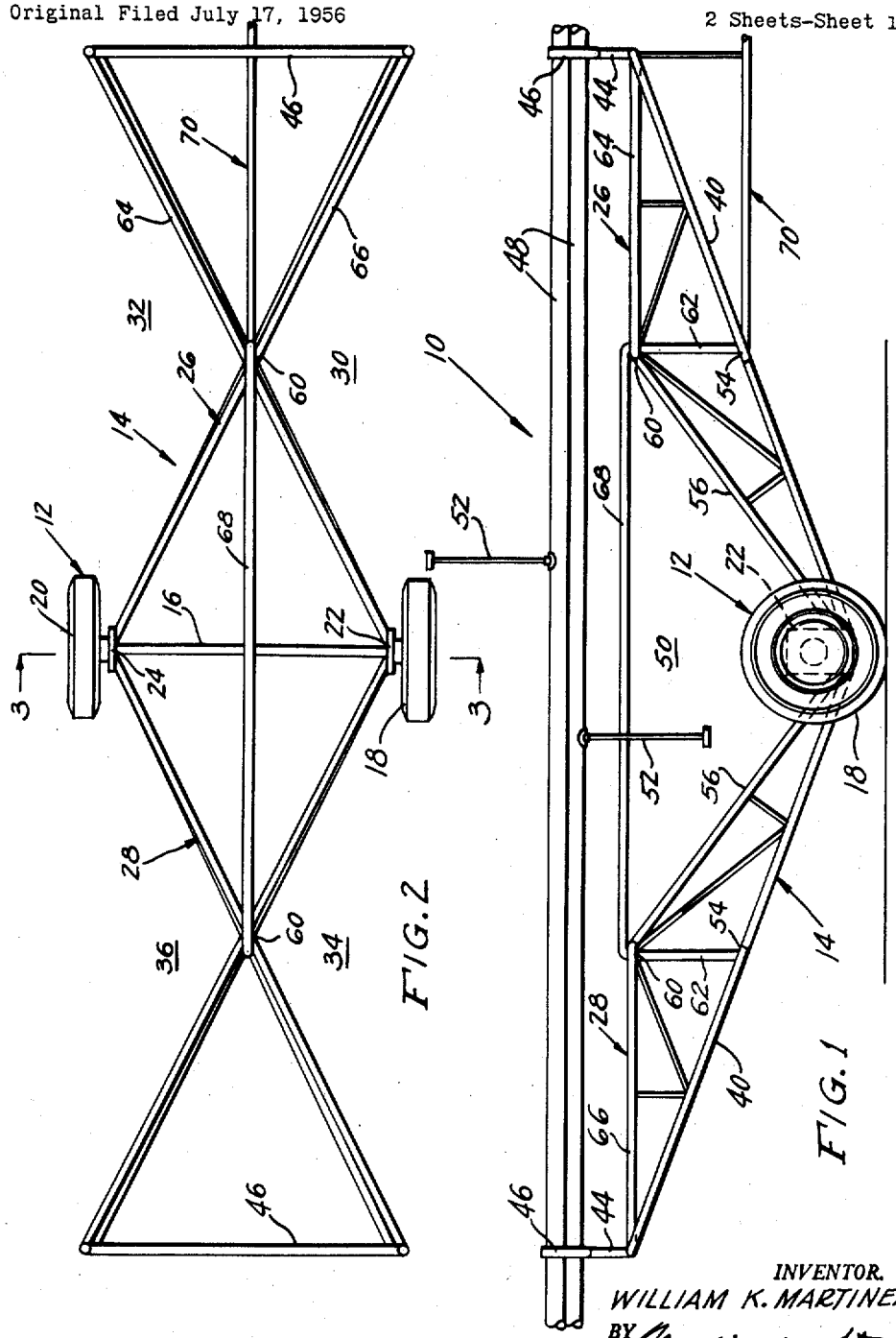
Figure 1 is a right-hand side elevational view of a trailer of the invention, showing irrigation pipe sections disposed thereon.
Figure 2 is a top plan view of Figure 1, with the pipe sections removed.

Referring to the drawings in detail, the illustrated trailer, indicated generally at 10, comprises a wheel and axle assembly 12, and a frame 14.

Figure 3:
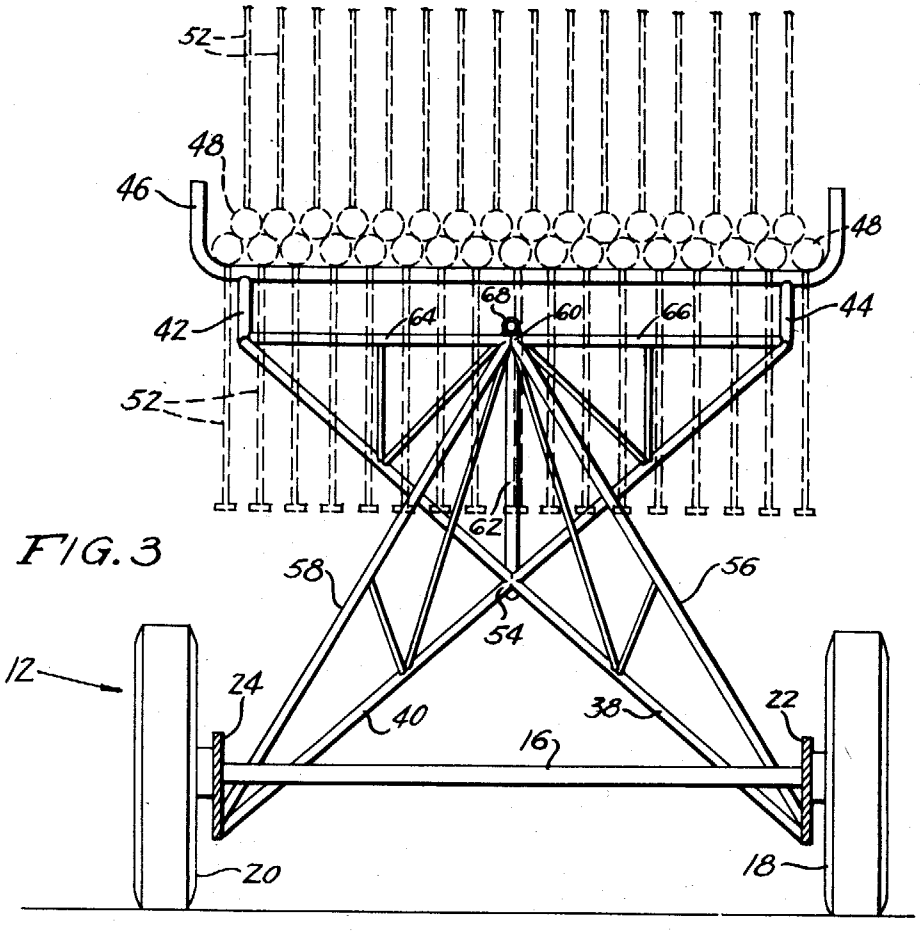
Figure 3 is an enlarged vertical transverse sectional view taken substantially on line 3—3 of Figure 2, showing in phantom lines the sections of an irrigation lateral loaded on the trailer.

The wheel and axle assembly 12 comprises a transverse axle 16 having suitably secured on opposite ends thereof wheels 18 and 20, the axle being journaled through spaced vertical support plates 22 and 24, as clearly seen in Figure 3.

The frame 14 comprises a pair of similar front and rear frame sections, indicated generally at 26 and 28. The frame sections 26 and 28 are substantially X-shaped when viewed in plan, and the narrow parts of these *frame* [frames] sections define recesses 30 and 32, and 34 and 36, on opposite sides of the frame 14, enabling a worker to get close to the longitudinal axis of the frame 14 and readily reach pipe thereon, so that loading and unloading of the trailer is facilitated.

Each of the frame sections 26 and 28 *is fabricated in crossed truss formation and extends in cantilever fashion*

*from the axle 16. As can be clearly seen from the drawings, each of such frame sections includes a pair of crossed trusses intersecting and secured to each other intermediate the length of the section, the two trusses being tied together at their outer ends by transverse structural means. Also as can be clearly seen from the drawings, the two frame sections are inclined upwardly as they extend outwardly from axle 16 and are tied together at the intersections of their pairs of trusses, respectively, by longitudinal structural means.*

*In the form illustrated, the trusses of each frame section* [includes] *include* a pair of crossed and intersecting longitudinally lower inwardly declining straight bars 38 and 40, [and] *which are* secured together intermediate their ends in first intersections 54, *and* whose inner depressed ends are secured to related ones of the support plates 22 and 24. The elevated longitudinally outward ends of the bars 38 and 40 terminate in upstanding portions 42 and 44, respectively, which are secured to the under sides of transversely disposed U-shaped type supporting bars 46 upon which are adapted to be laid irrigation pipe sections 48 to extend longitudinally of the trailer, with the lateral risers 52 of the lowermost layer of pipe sections disposed at the deep central portion 50 of the frame 14. *The bars 46 serve, in this instance, as the transverse structural means mentioned hereinbefore.*

Extending forwardly and rearwardly and upwardly from the support plates 22 and 24 and spaced above related ones of the bars 38 and 40, are pairs of converging bars 56 and 58 whose upper ends intersect at 60. The intersections 54 and 60 have extending therebetween vertical brace bars 62, and extending forwardly and rearwardly from the intersections 60 and spaced above the corresponding parts of the bars 38 and 40 are diverging horizontal bars 64 and 66. Extending longitudinally between the intersections 60 of the frame sections 26 and 28 is a longitudinal bar 68, *which serves in this instance as the longitudinal structural means mentioned hereinbefore.*

Suitable brace rods may be secured between the various bars described above for rigidifying the frame 14.

Indicated generally at 70 is a horizontal, longitudinally extending bar having its rear end secured to the intersection 54 of the bars 38 and 40 of the front section 26, the bar 70 being adapted to be connected at its forward end to a hitch assembly (not shown) of a draft vehicle.

The foregoing is considered as illustrative of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed is:

*1.* [In a] *A* pipe-section transporting trailer, *comprising* a wheel and axle assembly having spaced support plates, a longitudinally elongated frame comprising front and rear sections, each of said sections comprising a pair of crossed and intersecting longitudinal lower bars having [longitudinally] inward and [longitudinally] outward ends, [said] *the pairs of* lower bars *of the frame sections* being positioned in *respective,* longitudinally *and* [inward] *inwardly* declining planes, with [the] *their* inward ends [of said lower bars] secured to related ones of said support plates, said [pairs of] lower bars *of said pairs* being [in longitudinally outwardly converging relation to each other and] secured together intermediate their ends in *respective* first intersections, vertical brace bars secured to and rising from said first intersections, *respectively,* and having upper ends, each of said frame sections further comprising a pair of longitudinally *and* outwardly converging upper [longitudinal] bars having [longitudinally] inward ends secured to related ones of said support plates and [longitudinally] outward ends secured together in *a* second [intersections] *intersection* at the upper ends of said vertical brace [bars] *bar*[.] *of that frame section,* the upper [longitudinal] bars being spaced above the lower [longitudinal] bars, transverse brace bars extending in diverging relationship between and secured to the second intersection and the [longitudinally] outward ends of the lower [longitudinal] bars, vertical portions on the [longitudinally] outward ends of the lower [longitudinal] bars rising above said transverse brace bars, U-shaped, transverse, pipe-section supporting bars secured to and extending between [the] *said* vertical portions of the lower [longitudinal] bars of the *respective* frame sections, and a longitudinal bar extending between and secured to [said] *the* [second intersections] *vertical brace bars.*

*2. A transport trailer for elongate items, comprising a wheel and axle assembly; a longitudinally elongated frame having front and rear sections secured to said assembly and extending upwardly and outwardly therefrom in symmetrical, cantilever relationship, each of the frame sections including structural members rigidly secured together to form a pair of trusses which intersect and cross intermediate their lengths and which are upwardly inclined, longitudinally, from said axle, and each of said frame sections further including transverse structural means rigidly tying the outer ends of the corresponding pair of trusses together and providing support for a load of said elongate items to be transported; and longitudinal structural means extending substantially along the longitudinal axis of the trailer and rigidly tying the pairs of trusses of said frame sections together.*

*3. The transport trailer of claim 2, wherein an elongate structural element interconnecting the intersections of the pairs of trusses, respectively, constitutes the longitudinal structural means.*

*4. A transport trailer for sections of sprinkler irrigation pipe provided with lateral risers, comprising a wheel and axle assembly; a longitudinally elongated frame having front and rear sections secured to the axle of said assembly and extending upwardly and outwardly therefrom in symmetrical, cantilever relationship, each of the frame sections including structural members rigidly secured together to form a pair of trusses which intersect and cross intermediate their lengths and which are upwardly inclined, longitudinally, from said axle, and each of said frame sections further including transverse structural means rigidly tying the outer ends of the corresponding pair of trusses together and providing support for said sections of pipe; and longitudinal structural means rigidly tying the pairs of trusses of said frame sections together, the said trailer having space above the axle for accommodating lateral risers depending from loaded pipe sections and having indentations at opposite lateral sides of the respective frame sections affording convenient access to the longitudinal axial center of the trailer for loading and unloading purposes.*

References Cited in the file of this patent or the original patent

UNITED STATES PATENTS

| | | |
|---|---|---|
| 528,939 | Grabill | Nov. 13, 1894 |
| 812,272 | Kaylor | Feb. 13, 1906 |
| 900,455 | Weir | Oct. 6, 1908 |
| 1,654,480 | Fuller | Dec. 27, 1927 |
| 2,188,578 | Robinson | Jan. 30, 1940 |
| 2,261,354 | Fee | Nev. 4, 1941 |
| 2,642,311 | Beyer | June 16, 1953 |
| 2,715,030 | Peterson | Aug. 9, 1955 |
| 2,742,319 | Tobin | Apr. 17, 1956 |

FOREIGN PATENTS

| | | |
|---|---|---|
| 619,759 | France | Jan. 5, 1927 |
| 86,145 | France | June 21, 1869 |
| 14,653 of 1905 | Great Britain | July 17, 1905 |